United States Patent

Sakata et al.

[11] 4,273,356
[45] Jun. 16, 1981

[54] REAR WHEEL SUSPENSION DEVICE FOR VEHICLES

[75] Inventors: Mamoru Sakata, Tokyo; Yozo Kami, Sakado; Tetsuro Mitsui, Shihi, all of Japan

[73] Assignee: Honda Giken Kogyo Kabushiki Kaisha, Tokyo, Japan

[21] Appl. No.: 68,759

[22] Filed: Aug. 23, 1979

[30] Foreign Application Priority Data

Dec. 28, 1977 [JP] Japan .................... 52/179474[U]

[51] Int. Cl.³ ............................................... B60G 3/20
[52] U.S. Cl. ................................................... 280/675
[58] Field of Search .............. 280/674, 675, 673, 690, 280/716, 676; 267/21 R, 21 A, 20 A, 20 R

[56] References Cited

U.S. PATENT DOCUMENTS

| | | | |
|---|---|---|---|
| 3,139,275 | 6/1964 | Burkitt | 280/673 X |
| 3,237,962 | 3/1966 | Kraus et al. | 280/673 |
| 3,584,895 | 6/1971 | Vemura | 280/690 |
| 3,608,927 | 9/1971 | Grosseau | 280/716 |
| 3,620,548 | 11/1971 | Van Winsen et al. | 280/674 |
| 3,942,815 | 3/1976 | Schwenk et al. | 280/675 |
| 3,942,816 | 3/1976 | Scherenberg et al. | 280/673 |
| 4,139,246 | 2/1979 | Mikoshiba et al. | 280/673 X |
| 4,159,125 | 6/1979 | Buchwald | 280/673 X |

FOREIGN PATENT DOCUMENTS 987778 3/1965 United Kingdom .................... 280/673

Primary Examiner—Randolph A. Reese
Assistant Examiner—Norman L. Stack, Jr.
Attorney, Agent, or Firm—Irving M. Weiner; Pamela S. Burt; John L. Shortley

[57] ABSTRACT

A rear wheel suspension device comprises a radius rod extending substantially in the longitudinal direction of a vehicle body, pivotally supported at one end and supporting the rear wheel axis at the other end, and a lower arm supporting at one end the rear wheel axle in cooperation with the radius rod and pivotally supported at the other end on the vehicle body, the radius rod extending substantially at 90 degrees to the lower arm. A resilient bush supporting the radius rod is formed to be relatively more resilient in the back-and-forth direction of the wheel, and a resilient bush supporting the lower arm in the transverse direction of the wheel is substantially rigid. With this arrangement, the movements of the rear wheel due to side forces in the toe-in and toe-out directions are suppressed for maintaining roadability, and at the same time the compliance in the back-and-forth directions of the rear wheel is enhanced for improved riding comfort.

5 Claims, 7 Drawing Figures

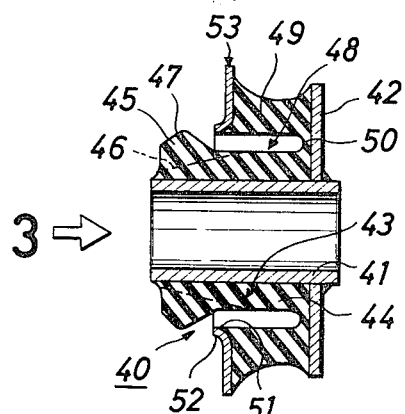
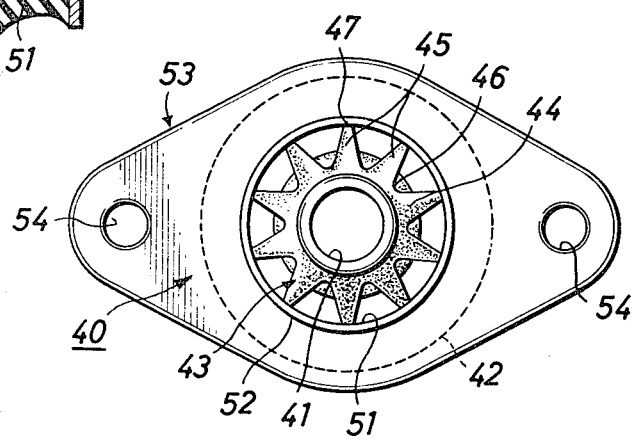
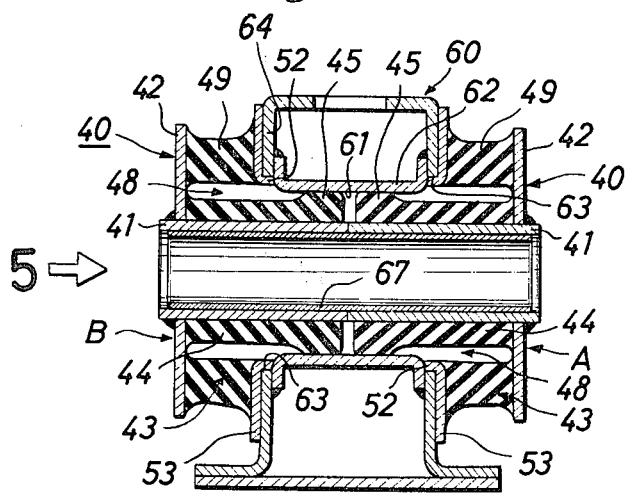

REAR WHEEL SUSPENSION DEVICE FOR VEHICLES

DESCRIPTION

Technical Field

The present invention relates to a rear wheel suspension device for vehicles.

Background Art

A rear wheel of a vehicle has an axle supported on first ends of a radius rod and a lower arm, which each have other ends thereof pivotally supported on the vehicle body, there being a shock absorber disposed between the axle and the vehicle body for suspending the rear wheel so as to provide damping action.

The rear wheel of the vehicle is subjected to back-and-forth movements when moving over recesses and projections on the road, and transverse movements due to either turning action of the vehicle, or travel over such recesses and projections. As for the back-and-forth movements, when the rear wheel moves over the recesses and projections or onto obstructions such as curbs, riding comfort is reduced unless smooth displacement in the movements of the rear wheel is assured. On the other hand, fluctuating movements of the rear wheel in toe-in and toe-out directions are undesirable in view of roadability, and if so moved, the vehicle body will be vibrated to thereby reduce riding comfort.

With prior rear wheel suspension devices, angles between the radius rod and the lower arm with respect to the axle are small, such rod and arm being connected to the axle with a substantially V-shaped arrangement when viewed from above. If the radius rod is pivotally supported by a resilient bush which is sufficiently resilient to allow the rear wheel to move back and forth so that it will smoothly comply with road conditions for improved riding comfort, such structure will suffer from the following defects.

Because the angle between the radius rod and the lower arm is small, movements of the rear wheel in the toe-in and toe-out directions occur and become larger and larger, with the results that a slip angle of the wheel changes and roadability is detrimentally affected. Furthermore, the vehicle body is subjected to increasing vibration, and roadability and riding comfort are thus adversely affected.

DISCLOSURE OF INVENTION

The present invention effectively solves the problems attendant known rear wheel suspension devices for vehicles.

An object of the present invention is to provide a rear wheel suspension device for vehicles, in which a radius rod extending in the longitudinal direction of the vehicle extends substantially at an angle of 90 degrees to a lower arm extending transversely of the vehicle body, the radius rod and lower arm being attached to a rear wheel axle. A resilient bush supporting the radius rod on the vehicle body is relatively highly resilient in the back-and-forth direction of the wheel, and a resilient bush supporting the lower arm in the transverse direction of the wheel is substantially rigid.

According to the invention, the radius rod extends in the longitudinal direction of the vehicle body and the lower arm extends substantially at a right angle to the radius rod, so that the lower arm can resist the transverse movement of the rear wheel reliably. Therefore, even if the resilient bush allows the back-and-forth movement of the radius rod, the movements and twist of the rear wheel in the toe-in and toe-out directions are attenuated by the lower arm. This action of attenuation can reliably be carried out by selecting a relatively less resilient material for the resilient bush on the lower arm to prevent its movement in the longitudinal direction of the arm, i.e., in the transverse direction of the rear wheel. Accordingly, the rear wheel is responsively smoothly movable in the back-and-forth direction, while at the same time it is prevented from moving and twisting transversely thereof, whereby roadability is sufficiently maintained and riding comfort is increased greatly.

Further, the rear wheel suspension device for vehicles in accordance with the invention is simple in structure and inexpensive to manufacture in that the radius rod and lower arm are attached as described above, the bush for supporting the radius rod being highly resilient and the bush for supporting the lower arm being substantially rigid.

Another object of the invention is to provide a rubber bush to be disposed in a support for supporting the radius rod on the vehicle body, the rubber bush allowing the back-and-forth movement of the radius rod perpendicular to its pivot, while permitting smooth pivotal motion of the rod.

More specifically, there are provided a pair of rubber bushes each comprising inner and outer rubber portions with a clearance therebetween, the rubber portions being united together and disposed around a tubular member. The rubber bushes are fitted symmetrically into an attachment through hole in the radius rod, and a shaft is inserted to extend through the tubular members. The shaft and the radius rod are assembled together by the rubber bushes, and the radius rod is supported on the vehicle body.

With such an arrangement, greater resiliency is afforded during an initial interval of the movement of the radius rod because there is a clearance between the inner and outer rubber portions of the bush, and resiliency is substantially reduced after the rubber portions are compressed. In this manner, the pivotal movement of the radius rod and its movement in a right direction to the shaft on the radius rod can be smooth at an initial stage, and sluggish thereafter. The back-and-forth movement of the radius rod caused by the rear wheel is initially smooth for effectively increasing riding comfort, and during a subsequent interval, both roadability and riding comfort are improved effectively. The rubber bushes are simple in structure and can be assembled with ease. They can be assembled faster at a lower cost because they need merely be fitted into an attachment hole in the radius rod from the opposite sides thereof.

BRIEF DESCRIPTION OF DRAWINGS

FIG. 2 is a cross-sectional view of a rubber bush.

FIG. 3 is a view of the rubber bush as seen in the direction 3 of FIG. 2, showing the inner end side of the rubber bush.

FIG. 4 is a cross-sectional view of the rubber bushes mounted on a radius rod.

BEST MODE FOR CARRYING OUT THE INVENTION

The present invention will be described by way of example with reference to the accompanying drawings which illustrate the invention for better understanding of its specific structure and advantages.

Figure 1:
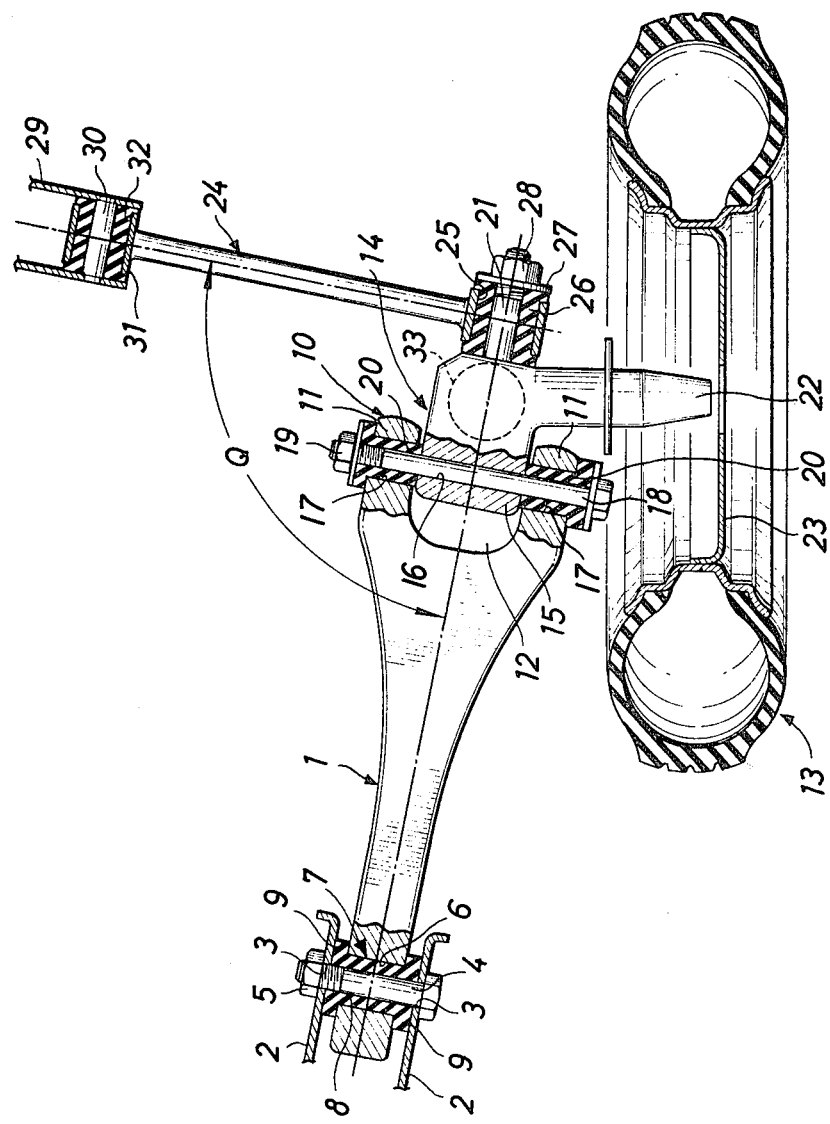
FIG. 1 is a schematic plane view, with essential parts in cross section, of a rear-wheel suspension device according to an embodiment of the present invention.

FIG. 1 shows a basic structure of a suspension device according to the invention.

In FIG. 1, a radius rod 1 extends substantially in the longitudinal direction of a vehicle body. The radius rod 1 has a front end portion pivotally supported on a bracket 2 on the vehicle body by a pin, such as a bolt 4 and nut 5 in the illustrated embodiment, disposed in attachment holes 3 in the bracket, the rod being angularly movable up and down about the bolt 4. A rubber bush 7 is disposed between the bolt 4 and an attachment hole 6 in the front end portion of the radius rod 1. The bush 7 includes a body 8 held in contact with the wall of the hole 6, the body 8 being set to be relatively more resilient in a direction perpendicular to the bolt 4, i.e., in the longitudinal direction of the radius rod 1, and also includes flange portions 9 sandwiched between the bracket 2 and side portions around the hole 6 and located at the ends of the body 8, the flange portions 9 being set to be relatively less resilient. Accordingly, the radius rod 1 is relatively movable in its longitudinal direction at the pivotal portion, with the transverse movement thereof being restricted.

The radius rod 1 has a rear end portion bifurcated at 10, including a pair of arms 11, 11 extending longitudinally of the rod. The arms 11, 11 provide a space 12 therebetween in which there is disposed a front support 15 of a rear hub carrier 14 acting as an axle of a rear wheel 13. The support 15 has an attachment aperture 16 extending widthwise thereof, there being a bolt 18 extending through the aperture 16 and through attachment apertures 17 provided widthwise in the arms 11, 11. The arms and the support are coupled together by a nut 19. The rear hub carrier 14 is pivotally supported by the bolt 18 on the rear end portion of the radius rod 1. Rubber bushes 20 are disposed between the attachment apertures 17 in the arms 11, 11 and the bolt 18. The bushes 20 permit pivotal movement and are substantially nonresilient or rigid in both the longitudinal and transverse directions. The rear hub carrier 14 has the supports 15 extending forwardly, a bolt 21 extending rearwardly, and an axle 22 extending across the arms and the bolt in the outward direction of the vehicle body, the axle 22 supporting a hub 23 of the rear wheel 13.

To the bolt 21 of the rear hub carrier 14 is attached a front end of a lower arm 24, which is formed with a tube having an attachment hole 25 fitted over the bolt 21 of the rear hub carrier 14 with a rubber bush 26 interposed therebetween. The rubber bush 26 supports lower arm 24 in the longitudinal direction thereof and is substantially non-resilient or rigid so as to provide substantial resistance against the transverse movement of the rear hub carrier 14. The rubber bush 26 disposed in the attachment hole 25 in the lower arm 24 is pressed by a washer 27 and a nut 28 on the end of the bolt 21. The rear hub carrier 14 is pivotable about the bolt 21. The lower arm 24 has a proximal end pivotably secured by a pin 30 to a bracket 29 on the vehicle body. As with the front end, the proximal end of the lower arm 24 has a tube providing an attachment hole 31 through which the pin 30 extends. Between the pin 30 and the attachment hole 31, there is disposed a rubber bush 32 which is substantially rigid so as to resist the transverse movement of the rear wheel. The lower arm 24 is pivotally movable about the pin 30 with respect to the vehicle body.

The lower arm 24 extends substantially transversely of the vehicle body at an angle Q to the radius rod 1 extending in the longitudinal direction of the vehicle body, the angle Q being substantially 90 degrees. Although the radius rod 1 is shown as extending somewhat obliquely with respect to the axis of the vehicle body extending exactly longitudinally thereof, it will be understood that such oblique arrangement is necessitated by the mounting of the rear wheel 13 and other parts therearound. The radius rod 1 should preferably be extended as closely to the axial direction of the vehicle body as designing permits. Since the lower arm 24 extends substantially at an angle of 90 degrees to the radius rod 1, the lower rod extends obliquely with respect to the axis of the rear wheel 13.

The rear hub carrier 14 thus mounted on the radius rod 1 and the lower arm 24 is connected to a bottom of the vehicle body via a shock absorber 33.

When the rear wheel 13 moves over obstructions such as recesses and projections on the road during travel of the vehicle, the rear wheel 13 moves up and down through the action of the shock absorber 33 on the rear hub carrier 14 to thereby effect dampening action. The movement of the rear wheel 13 in the longitudinal direction of the vehicle is allowed to a predetermined extent since the rubber bushes 7, 20 on the front and rear end portions of the radius rod 1 are set to be relatively more resilient in such longitudinal direction. Under such conditions this condition, the rear wheel 13 is movable up and down and back-and-forth, there being provided an effective dampening action for a higher degree of riding comfort. On the other hand, the rear wheel 13 tends to move and twist in the transverse direction because the back-and-forth movement of the radius rod 1 is permitted at the pivotal portion on its front end portion. However, such movement of the rear wheel is suppressed by the lower arm 24. With the lower arm 24 extending substantially at 90 degrees with respect to the radius rod 1, the lower arm 24 resists the transverse movement of rear wheel 13. Furthermore, since the rubber bushes 26, 32 provide substantially non-resilient or rigid support in the transverse direction, there is provided further resistance against such transverse movement, thereby suppressing the lateral and twisting movement of the rear wheel 13. Accordingly, the rear wheel 13 is allowed to move back-and-forth while at the same time it is prevented from moving and twisting laterally, with the results that riding comfort is improved and favorable roadability is retained.

FIGS. 2 to 6 illustrate a rubber bush suitable for pivotally supporting the front portion of the radius rod on the vehicle body, the rubber bush permitting the radius rod to move smoothly back-and-forth.

The rubber bush and radius rod in the embodiment of FIGS. 2–6 are designated by reference numerals commencing with 40 and have the same functions as those of the radius rod 1 and the rubber bush 7.

FIGS. 2 and 3 show a rubber bush 40 as a single unit having a construction described in detail hereinbelow.

A tubular member 41 supports an annular flange 42 fixedly disposed therearound at its outer end, and a rubber member 43 has a radially inner body 44 with an inner peripheral wall which is fixed to the outer peripheral surface of the tubular member 41 by burning, for example. The radially inner body 44 extends axially to an inner end of the member 41 and has at its inner end a plurality of radial bulged portions 45, there being a plurality of V-shaped spaces 46 defined between the bulged portions 45 as clearly shown in FIG. 3. The bulged portions 45 comprise ridges 47 which are cone-shaped in section and are arranged such that the respective sides thereof defining spaces 46 converge toward the inner ends thereof.

A radially outer body 49 is disposed around and spaced radially outwardly from the inner body 44 with an annular clearance 48 therebetween. The outer body 49 has a length which is smaller than the axial length of the inner body 44, and extends up to the rear end of the radially outwardly tapered ridges 47 of the bulged portions 45. The outer body 49 and the inner body 44 are integrally connected at 50 so as to define a U-shaped cross section. Rear ends of the outer and inner bodies and the connecting portion 50 are fixed to flange 42 by burning. The inner diameter of the outer body 49 is set to be smaller than the outer diameter of the tapered ridges 47. Secured, by burning for example to the axially inner end face of the radially outer body 49 on the side proximal the bulged portions 45 is an attachment plate 53 having an opening 51 with a diameter equal to the inner diameter of the body 49, the opening 51 having a peripheral edge portion 52 turned axially toward the inner end. The attachment plate 53 is substantially oval-shaped, with a larger area than the flange 42, and has attachment holes 54, 54 provided in its end portions.

A pair A, B of such rubber bushes 40 are used as a set, the rubber bushes A, B being of an identical structure, dimension, and shape.

Figure 5:
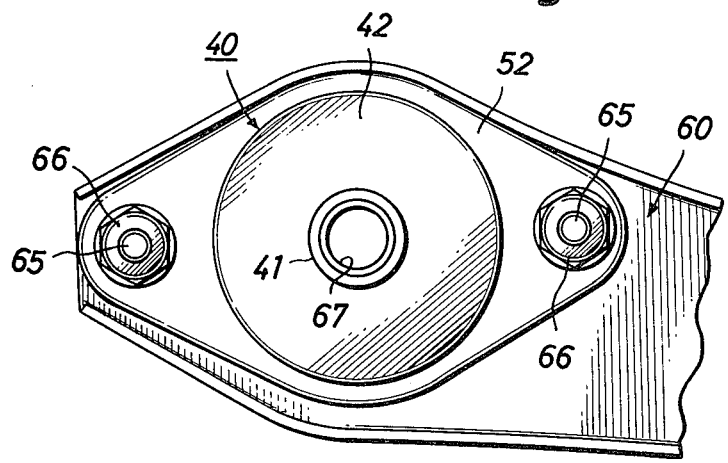
FIG. 5 is a view of the assembled rubber bushes as seen in the direction 5 of FIG. 4, showing the outer side of the assembly.
Figure 6:
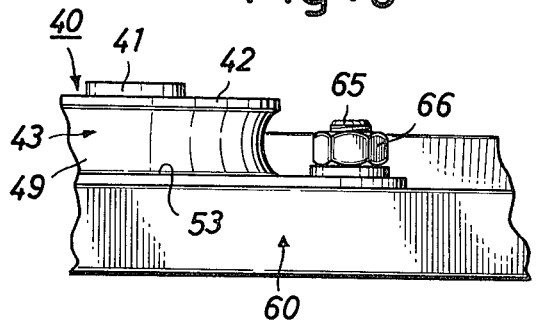
FIG. 6 is a plane view of a main portion of the assembly.

FIGS. 4, 5 and 6 illustrate a member 60 which is of the same structure as radius rod 1, with only the portion which is pivoted to the vehicle body being shown in enlarged scale.

The radius rod 60 in the illustrated embodiment comprises pressed steel plates jointed together, and has in its end portion a transverse through hole 61 formed by a cylindrical member 62 extending laterally in the illustrated embodiment.

The radially inner bodies 44 of the rubber bushes A, B used in a pair are inserted from the opposite sides into the attachment hole 61 of the radius rod 60. The attachment hole 61 is diametrically larger than the inner bodies 44, and smaller than the bulged portions 45, so that the bulged portions 45 will yield as they are forced into the attachment hole 61. The bulged portions 45 can easily yield because the cone-shaped ridges 47 are spaced radially with the spaces 46 therebetween. The tapered ridges 47 of the bushes A, B are disposed in confronting relation to each other at the center in the attachment hole 61. When the bushes A, B are inserted to the limit, the turned edges 52 around the openings 51 in the retaining plates 53 fit in steps 63 formed at axial ends of the attachment hole 61, and the plates 53 abut against walls 64 around the hole 61 in the radius rod 60, whereupon positioning of the elements is accomplished against further insertion of the bushes. The plates 53 thus positioned are fixed to the opposite sides of the radius rod 60 by bolts 65 and nuts 66, the bolts extending through the attachment holes 54. With the elements thus assembled, the annular clearances 48 are provided between the inner and outer peripheral bodies 44, 49 of the bushes A, B.

A tube 67 is forcibly inserted into the tubular members 41, 41 of the bushes A, B thus assembled together so as to unite the tubular members 41 and hence the rubber bushes A, B. The tube 67 has a length slightly less than that of the combined tubular members 41, 41. A shaft, not shown in FIGS. 4 to 6, is inserted through the tube 67 to allow the radius rod 60 to be supported on the vehicle body.

The radius rod 60 is pivotable about the shaft extending through the tube 67. In addition, the radius rod 60 is movable in a direction perpendicular to the shaft, or to the tube 67 and the tubular members 41, 41, i.e., in the longitudinal direction of the radius rod. While at an initial stage of such motion, because the attachment hole 61 is held in contact with the bulged portions 45 of the radially inner bodies 44 at peripherally spaced points, the clearances 48 permit the rubber members to yield under the aforesaid motion, thereby affording substantially high resiliency for smooth back-and-forth movement of the radius rod. When the rubber members yield until the clearances 48 are closed, the inner and outer bodies 44, 49 contact each other, whereupon springing force comes only from the jointed bodies themselves, and the radius rod becomes swiftly restrained from the back-and-forth movement by the greatly reduced resiliency, so as to enhance roadability.

In accordance with the invention, springing force is relatively low to a predetermined extent of back-and-forth stroke of the radius rod, while springing force is relatively high beyond such predetermined extent, so that springing force is not uniform in degree through the stroke. The motion of the radius rod is softly and smoothly allowed at an initial stage of the back-and-forth movement so as to be able to follow and absorb impacts caused by road obstructions, and the rear wheel is supported and given damping effects by high springing force for maintaining favorable roadability at the remaining stage.

Figure 7:
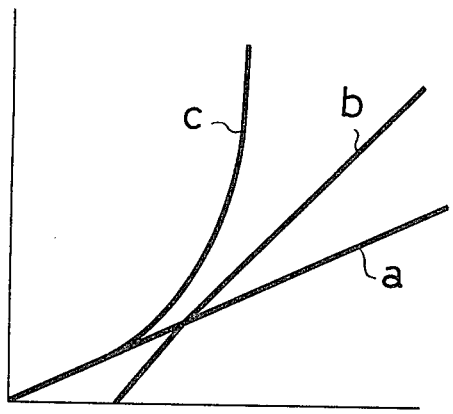
FIG. 7 is a graph illustrative of the characteristic of the rubber bushes.

FIG. 7 shows a graph in which the axis of abscissa represents rubber displacement and the ordinate represents springing action. The line a represents the characteristic of the inner body 44, and the line b represents the characteristic of the outer body 49, both lines being proportional. However, the lines a and b, when combined, produced the characteristic represented by the line c according to experimental results obtained with the bush 40. It will be understood from the graph that favorable roadability can be ensured by attaining high springing force during the stroke of the radius rod, which is important for roadability. Before such stroke, springing force is low to allow the radius rod to follow the movement of the wheel smoothly for an increased degree of riding comfort.

INDUSTRIAL APPLICABILITY

The present invention is utilizable for suspension of a rear wheel in that it allows a high degree of compliant movement in response to the back-and-forth movement of the rear wheel caused when it moves over recesses and projections on the road so as to improve riding comfort. At the same time, the transverse movement of the rear wheel in the toe-in and toe-out directions is suppressed for more favorable roadability. By using rubber bushes according to the invention, the aforementioned compliance is enhanced but the compliant movement can be restrained for maintaining roadability, which would otherwise be adversely affected. Accordingly, the invention provides an excellent suspension device for the rear wheel in automobiles, especially passenger vehicles.

We claim:

1. A rear wheel suspension device for vehicles comprising:
    a radius rod extending substantially in the longitudinal direction of the vehicle body, said radius rod being inclined with respect to the axis of the vehicle body;
    a lower arm extending substantially in the transverse direction of the vehicle body;
    said radius rod and said lower arm each supporting at one end an axle member of a rear wheel;
    said lower arm being inclined with respect to the axis of the rear wheel axle;
    said radius rod extending at an angle of 90 degrees to said lower arm;
    a rubber bush for supporting said radius rod on the vehicle body, said bush being formed to be relatively highly resilient in the back-and-forth direction of the rear wheel, and relatively substantially less resilient in the transverse direction of the rear wheel; and
    a rubber bush for supporting said lower arm, said rubber bush being substantially non-resilient so as to substantially rigidly support said lower arm in the transverse direction of the rear wheel.

2. A rear wheel suspension device according to claim 1, wherein said rubber bush supporting said radius rod comprises radially inner and outer bodies integrally connected in a part with a clearance therebetween, said radially inner body being associated with the vehicle body and said radially outer body being associated with the radius rod.

3. A rear wheel suspension device according to claim 1, wherein:
    a set of said rubber bushes each comprise a tubular member, an integral rubber member disposed around said tubular member and including double bodies of radially inner and outer bodies with a clearance therebetween;
    said bodies are connected by a flange at an axially outer end of said tubular member;
    said outer body has an axially inner end face connected with an attachment plate;
    said rubber bushes are inserted at their radially inner bodies into an attachment hole of the radius rod from opposite sides thereof in confronting relation to each other;
    said tubular members abutting each other have a tube inserted therein; and
    said rubber bushes are connected through said attachment plates provided on said end face of said inner bodies, to side faces of said radius rod around said attachment hole.

4. A rear wheel suspension device according to claim 3, wherein:
    said rubber bushes include bulged portions radially spaced on a part of said radially inner bodies.

5. A rear wheel suspension device according to claim 4, wherein:
    said radial bulged portions of said inner bodies are held in contact with said attachment hole such that said rubber bush is provided with relatively substantially more resiliency in the back-and-forth direction of the rear wheel than in the transverse direction by yielding of said rubber members to close said clearances defined between said radially spaced inner and outer bodies during back-and-forth movement of the radius rod.

* * * * *